United States Patent [19]

Fritz et al.

[11] 4,048,149

[45] Sept. 13, 1977

[54] WATER-SOLUBLE SULFONATED POLYESTERS

[75] Inventors: Jacques Fritz, Champagne au Mont d'Or; Paul Roux, Fontaine sur Saone; Jean Néel, Lyon, all of France

[73] Assignee: Rhone-Poulenc Industries, Decines, France

[21] Appl. No.: 585,679

[22] Filed: June 10, 1975

Related U.S. Application Data

[63] Continuation-in-part of Ser. No. 371,534, June 19, 1973, abandoned.

[30] Foreign Application Priority Data

Jan. 10, 1973 France ............................... 73.01358

[51] Int. Cl.$^2$ ...................... C08G 63/68; C08G 63/76; C07C 69/80; C07C 69/82

[52] U.S. Cl. ................................ 260/75 S; 260/75 T; 560/14; 560/90

[58] Field of Search .................. 260/475 P, 75 S, 75 T

[56] References Cited

U.S. PATENT DOCUMENTS

| 2,028,091 | 1/1936 | Jaeger et al. ........................ 260/75 S |
| 3,546,008 | 12/1970 | Shields et al. ...................... 117/138.8 |

FOREIGN PATENT DOCUMENTS

| 802,275 | 1/1974 | Belgium ............................... 260/485 |
| 43-10157 | 4/1968 | Japan | |

*Primary Examiner*—Jane S. Myers
*Attorney, Agent, or Firm*—Browdy and Neimark

[57] ABSTRACT

Water soluble sulfonated polyesters made by polycondensation of an aromatic diacid or its anhydride or diester and an unsaturated aliphatic diacid or its anhydride or diester with a saturated glycol and sulfonating.

2 Claims, No Drawings

WATER-SOLUBLE SULFONATED POLYESTERS

CROSS-REFERENCE TO RELATED APPLICATIONS

This application is a continuation-in-part of U.S. Ser. No. 371,534, filed June 19, 1973, now abandoned, which is hereby incorporated by reference. The present application is also related to U.S. Ser. No. 536,432, filed Dec. 26, 1974, now U.S. Pat. No. 3,978,262, which is a divisional of the above-mentioned parent application.

FIELD OF THE INVENTION

The present invention relates to new sulfonated polyesters obtained by sulfonation of an aliphatic chain of the polyesters.

BACKGROUND OF THE INVENTION

It is known for a long time (U.S. Pat. No. 2,028,091) that monomeric sulfonated esters can be obtained by reacting a sulfonated aliphatic dibasic acid with alcohols or eventually a glycol at a temperature lower than 150° C. The resulting products are monomers with low viscosity and very poor mechanical strengths.

It is also known (U.s. Pat. No. 3,546,008) that polymeric sulfonated polyesters can be obtained by reacting a sulfonated aromatic diacid with a glycol at a classical temperature of polymerization which is higher than 200° C.

Japanese Pat. No. 10157/68 relates to a treatment of spinnable polyesters which increases the affinity of the threads for basic dyes. According to said treatment, the spinnable polyesters contain a very low rate of an unsaturated chain which is sulfonated.

It is an object of the invention to provide new water-soluble sulfonated polyesters useful for sizing textiles and in detergent compositions.

It is known that a large range of unsaturated polyesters presenting a very broad utilization scope, can be obtained by polycondensation of a polyol with an unsaturated dicarboxylic acid, optionally in the presence of a saturated dicarboxylic acid. The resultant resins, though presenting properties suitable for various applications, show, however, the drawback of being water-insoluble, which limits their use to fields where this property is required. The applicants have endeavored to cope with this difficulty and have succeeded in developing new polyesters which are very interesting for various uses, and which are the object of the present invention.

SUMMARY OF THE INVENTION

The present invention relates to new water-soluble sulfonated polyesters obtained by polycondensation of a mixture of dicarboxylic compounds constituted of an aromatic diacid or anhydride or diester thereof and an unsaturated aliphatic diacid or anhydride or diester thereof with a saturated glycol, the sulfonation of the unsaturated aliphatic chain being carried out either on the unsaturated aliphatic compound before polycondensing or on the polycondensed product, characterized in that the molar ratio of unsaturated aliphatic compound/mixture of dicarboxylic compounds is higher than 0.05 and preferably between 0.1 and 0.5.

DESCRIPTION OF THE PREFERRED EMBODIMENTS

It has been shown analytically by infrared spectrophotometry that, in the case of the subsequent sulfonation of the condensation product, the sulfonation occurs only on the aliphatic unsaturation.

The polyesters resulting from the previous condensation of the various reactants followed by the sulfonation of the aliphatic double bonds are produced with more difficulty on account of the high viscosity of the polymer at 100° C., a temperature at which sulfonation is generally carried out. This difficulty, however, can be overcome by suitable technological processes.

On the other hand, the previous sulfonation of the diester of the unsaturated aliphatic diacid, and the reaction of this sulfonated diester with the two other constituents of the reaction, leading directly to the water-soluble sulfonated polyester, avoid the above-mentioned drawbacks of viscosity. This method allows moreover the production of polyesters having a high percentage of sulfonated groups, precisely on account of the absence of the viscosity problem during the sulfonation.

The direct sulfonation of the unsaturated aliphatic diacid or the anhydride thereof is carried out with difficulty and under not very satisfactory yield conditions, which practically constrains one to carry out the sulfonation on the single diester of the unsaturated aliphatic diacid.

By the term "aromatic diacid" in the present specification and claims is meant any aromatic diacid which has a benzene, napthalene or anthracene nucleus with two carboxylic acid groups thereon and optionally substituted with other saturated aliphatic chains which will not adversely affect the polycondensation reaction or the water-solubility or effectiveness of the final product. Similarly, any diester may be used which will not adversely affect the polycondensation reaction or the water-solubility or effectiveness of the final product. The aromatic diacid is otherwise unsubstituted by anything which will so affect the reaction or the final product. As non-limitative examples, there may be used orthophthalic, isophthalic or terephthalic acids or anhydrides or the methyl,ethyl,propyl, or butyl diesters thereof.

By the term "unsaturated aliphatic diacid" in the present specification and claims is meant any unsaturated aliphatic diacid or anhydride as long as the chain is not so long as to adversely affect the polycondensation reaction or the water-solubility or effectiveness of the final product and as long as it is unsubstituted by anything which will so affect the reaction or final product. As non-limitative examples, there may be mentioned maleic,fumaric and itaconic acids or anhydrides or the methyl,ethyl,propyl,butyl,ethylene-glycol,propylene-glycol or butylene-glycol diesters thereof.

According to the present invention, the molar ratio of unsaturated aliphatic compound/mixture of dicarboxylic compounds must be higher than 0.05, preferably comprised between 0.1 and 0.5.

Ethylene-glycol, propylene-glycols, butylene-glycols, polyethylene-glycols, such as the diethylene-, triethylene-, tetraethylene- and pentaethylene-glycols can be used as glycols.

The conditions of condensation for the production of these polyesters are the classical conditions of heating for about 2 to 5 hours, at a temperature increasing gradually to 220°-270° C., the reactants being in stoichiometric proportions, or with an excess of glycol which may reach about two moles of glycol for one mole of dicarboxylic compounds. The sulfonation is then carried out at an average temperature between 20° and 100° C. for 3 to 6 hours, in the presence of a small quantity of water, at atmospheric pressure or under higher pressure. Sodium bisulphite or sodium metabisulphite are preferably used as sulfonating agents acting on the unsaturations of the aliphatic chains. The quantity of sulfonating agent is calculated stoichiometrically in relation to the unsaturated diacid used.

As sulfonated aliphatic diesters, used in the case of the previous sulfonation, are the diesters resulting from the sulfonation of a diester of unsaturated aliphatic diacid or of its anhydride, such as maleic, fumaric, and itaconic diesters. Preferably will be used the methyl, ethyl, propyl, butyl diesters, the ethylene-glycol, propylene-glycol, butylene-glycol diesters and so on.

The sulfonation of diesters of unsaturated aliphatic diacids is carried out at an average temperature between 20° and 100° C., for 1 to 3 hours, in the presence of water, at atmospheric pressure or under higher pressure. As sulfonating agents, preferably the sodium bisulphite or sodium metabisulphite will be used.

The conditions of condensation for the subsequent production of sulfonated polyesters are the classical conditions of heating for about 2 to 15 hours, at a temperature increasing gradually to 180°-250° C., the reactants being in stoichimetric proportons or with an excess of glycol which may reach 2 moles of glycol for one mole of dicarboxylic compounds.

Examples of accomplishing the invention will be given in a non-limitative way.

1. Previous condensation of the various constituents, then subsequent sulfonation

EXAMPLE 1

Condensation

In a 0.5 liter vessel fitted with a stirrer and a condenser, the following reactants are introduced:

| dimethyl isophthalate | 174.6 g. | 0.9 mole |
| dimethyl maleate | 14.4 g. | 0.1 mole |
| diethylene glycol | 110.0 g. | 1.05 moles |
| tetra-isopropyl O-titanate | 0.3 ml. | |

(Molar ratio maleate/maleate + isophthalate = 0.1)

The mixture is heated with agitation and under a low stream of nitrogen at atmospheric pressure, with gradually increasing the temperature from 20° to 220° C for 2 hours, at the end of this period 60 g of methanol are recovered.

The condensation proceeds under a vacuum of 2 mm Hg, with a temperature increasing from 220° to 260° C for 30 minutes. This temperature and pressure are kept constant for 30 minutes, which is the period of time necessary to achieve the condensation and to remove the excess of diethylene-glycol.

The reaction mixture is cooled to 100° C before breaking vacuum, so as to prevent the maleic double bonds from oxidizing.

Sulfonation

The following is poured, under agitation and at 100° C, on the resultant polyester:
— 9.5 g of powdered sodium metabisulphite,
— then 20 ml of distilled water introduced for 30 minutes by means of a dropping flask.

It is heated to reflux about 110° C, for 2 hours.

An opaque yellow product, solidifying when cooled, and containing about 7% of water, is obtained. It is dispersed in hot water under agitation, giving an opaque solution.

Inherent viscosity of the dry product = 0.23

(The inherent viscosity is determined at 0.25% and at 25° C in a solution containing 60 g of phenol and 40 g of tetrachlorethane).

EXAMPLE 2

The conditions of Example 1 (same conditions of condensation and sulfonation) are carried out, but the diethylene glycol is replaced by triethylene glycol.

The reactants are as follows:

| dimethyl isophthalate | 174.6 g. | 0.9 mole |
| dimethyl maleate | 14.4 g. | 0.1 mole |
| triethylene glycol | 157.5 g. | 1.05 moles |
| tetra-isopropyl o-titanate | 0.3 ml. | |

(Molar ratio maleate/maleate + isophthalate = 0.1)

Sulfonation

The following is poured, onto the resultant product, as indicated in Example 1:

| sodium metabisulphite | 9.5 g. |
| water | 20 ml. |

A deep yellow product, soft and sticky, even after drying, is obtained:

Inherent viscosity — 0.38

It is soluble in hot water.

The 20% solution is white. It turns into a gel after cooling.

EXAMPLE 3

The conditions of Example 1 are repeated, but the dimethyl isophthalate is replaced by dimethyl terephthalate; the sulfonation is then carried out under a pressure of 2 bars, at about 130° C.

The reactants are as follows:

| dimethyl terephthalate | 174.6 g. | 0.9 mole |
| dimethyl maleate | 14.4 g. | 0.1 mole |
| diethylene glycol | 159.0 g. | 1.5 moles |
| -tetra-isopropyl-o-titanate | 0.3 ml. | |

(Molar ratio maleate/maleate + terephthalate = 0.1)

Sulfonation

The following is poured onto the resultant product:

| sodium metabisulfite | 9.5 g. (0.05 mole) |
| water | 20 ml. |

The reaction is carried out in a stainless steel vessel, under a pressure of 2 bars at a temperature of 130° C, for 2 hours.

An opaque yellow product, quite hard and soluble in hot water is obtained. The 10% solution is white and viscous. It turns into a gel after cooling.

EXAMPLE 4

The condensation is carried out under the same conditions as in Example 1, but the sulfonation is accomplished by means of a sodium bisulphite solution.

The reactants used are as follows:

| | | |
|---|---|---|
| dimethyl isophthalate | 136.0 g. | 0.7 mole |
| dimethyl maleate | 43.0 g. | 0.3 mole |
| diethylene glycol | 106.0 g. | 1 mole |
| tetra-isopropyl o-titanate | 0.3 ml. | |

(Molar ratio maleate/maleate + isophthalate = 0.3).

Sulfonation

Onto the polyester obtained which is kept at 100° C, 400 ml of a 50/50 solution of sodium bisulphite at 36° C Be and distilled water are introduced under a strong agitation for 1 hour.

The temperature and the agitation are kept for 4 hours.

After cooling at 50° C, two layers are separated by centrifugation. The organic bottom layer is the sulfonated polyester containing about 30% of water.

Inherent viscosity — 0.23

The product is soluble in hot water, thus giving a slightly turbid solution,

EXAMPLE 5

The conditions of Example 1 are slightly modified. Dimethyl isophthalate is replaced by isophthalic acid, and a polymerization inhibitor is introduced.

Condensation

Into a 2 liter vessel, fitted with a stirrer and a condenser, are introduced:

| | | |
|---|---|---|
| isophthalic acid | 747 g. | 4.5 moles |
| maleic anhydride | 49 g. | 0.5 mole |
| diethylene glycol | 1.060 g. | 10 moles |
| 2,5 ditertiobutyl-hydroquinone | 1 g. | |
| tetra-isopropyl o-titanate | 1.5 g. | |

(Molar ratio maleic/maleic + isophthalic = 0.1)

It is heated under agitation and under a slight stream of nitrogen, at atmospheric pressure, the temperature gradually increasing from 20° to 225° C for 1½ hour. The condensation process under a vacuum of 2 mm Hg is continued, the temperature increasing from 225° C to 240° C for 1½ hour. It is cooled to 140° C, then the vacuum is broken.

Sulfonation

The following is poured under agitation and at 100° C, onto the resultant polyester:

| | |
|---|---|
| sodium metabisulfite | 50 g. |
| water | 100 ml. (introduced during 1 hour) |

The temperature is kept at 100° C for 3 hours.

The resultant product is soluble in hot water, giving a slightly turbid solution.

Inherent viscosity of the dry product: 0.19

EXAMPLE 6

The unsaturated diacid utilized is itaconic acid.
Condensation

Into a 0.5 liter vessel, fitted with a stirrer and a condenser, are introduced:

| | | |
|---|---|---|
| isophthalic acid | 133 g. | 0.8 mole |
| itaconic acid | 26 g. | 0.2 mole |
| diethylene-glycol | 212 g. | 2 moles |
| 2,5 ditertiobutyl-hydroquinone | 0.5 g. | |
| tetraisopropyl o-titanate | 0.3 ml. | |

(Molar ratio itaconic/itaconic + isophthalic = 0.2)

The mixture is heated under agitation and under a slight stream of nitrogen, with a temperature increasing from 20° to 220° C in 1 hour 30 minutes; the temperature is maintained at 220° C for 30 minutes, then under a vacuum of 2 mm Hg, the temperature is increased from 220° to 235° C in 1 hour. 34 g of water and 100 g. of diethylene-glycol are recovered.

Sulfonation

Onto the resultant polyester, the following is poured under agitation and at 100° C:

| | |
|---|---|
| sodium metabisulphite | 20 g. |
| water | 200 ml. (introduced during 1 hour) |

The temperature is kept at 100° C for 6 hours and under agitation.

The product is then dried 48 hours in an oven at 105° C.

The resultant product is slightly colored, dissolves easily in water and gives a nearly clear solution.

Inherent viscosity of the dry product: 0.16

EXAMPLE 7

The conditions are the same as in Example 1, but a mixture 50/50 of diethylene glycol and triethylene glycol is used.

Condensation

Into a 2 liters vessel fitted with a stirrer and a condenser are introduced:

| | | |
|---|---|---|
| dimethyl isophthalate | 873 g. | 4.5 moles |
| dimethyl maleate | 72 g. | 0.5 mole |
| diethylene glycol | 265 g. | 2.5 moles |
| triethylene glycol | 413 g. | 2.75 moles |
| tetraisopropyl o-titanate | 1.5 ml. | |

(Molar ratio maleate/maleate + isophthalate : 0.1)

It is heated under agitation and under a slight stream of nitrogen, at atmospheric pressure, gradually increasing the temperature from 20° to 225° C, in 1½ hours, then under a vacuum of 2 mm Hg, gradually increasing the temperature to 250° C in 1½ hours. The temperature is decreased until 120° C, then the vacuum is broken. There is recovered:

| | |
|---|---|
| methanol | 280 g. |
| triethylene glycol | 25 g. |

Sulfonation

On the resultant polyester, there is poured under agitation and at 100° C:

| | |
|---|---|
| sodium metabisulphite | 50 g. |
| water | 100 g. (introduced in 1 h) |

The temperature is kept at 100°–105° C for 5 hours.

An opaque yellow product, easily soluble in hot water is obtained. The 20% solution is viscous and opaque.

Inherent viscosity of the dry product: 0.23.

II. Previous sulfonation of the unsaturated aliphatic compound, then subsequent condensation of the various constituents A first example will be given of the production of the sulfonated derivative, from dimethyl maleate, giving, after sulfonation, the dimethyl sodio-sulfosuccinate.

In a 20 liter flask, fitted with heating means, a stirring helix, a condenser and surmounted by a dropping funnel, are introduced:

| dimethyl maleate | 20 moles (2883 g.) or 2.5 liters |
|---|---|
| water | 80 moles (1440 g.) |

Agitation is started, and a milky suspension is obtained. In the dropping funnel which is above the flask are introduced:

| sodium metabisulphite | 10 moles | (1900 g.) |
|---|---|---|
| water | 220 moles | (3960 g.) |

The temperature of the flask is at first increased to about 95° C, then the charge is introduced by aliquots from 300 to 500 ml., so that the temperature is maintained by itself between 93° and 98° C. When the whole of the sodium metabisulphite solution has been introduced (which requires about 50 minutes) this temperature is kept at 100° C for 1 hour. The reaction yield is 98%. It is left to crystallize for one night, then it is filtered on sintered glass. A product is thus obtained with a yield of 51%; it is then dried in a ventilated oven at 60° C.

Examples of realization of the invention will now be given in a non-limitative way, utilizing dimethyl sodio-sulfosuccinate, the manufacture of which is above-described.

EXAMPLE 8

The following is introduced into a vessel:

| isophthalic acid | 315.4 g. | 1.9 moles |
|---|---|---|
| dimethyl sodiosulfosuccinate | 24.8 g. | 0.1 mole |
| diethylene glycol | 233.2 g. | 2.2 moles |
| tetra-isopropyl o-titanate | 0.6 ml. | |

(Molar ratio sulfosuccinate/sulfosuccinate + isophthalic = 0.5)

A quick increasing of temperature, from 20° to 160° C, is carried out at first, under a stream of nitrogen, which necessitates about 1 hour; then a slower increasing is carried out, from 160° C to 200° C, in 3 hours. This temperature is maintained for 2 hours at 200° C.

During this time, about 55 ml. of a mixture of water and methanol are extracted. The excess of diethyleneglycol (about 20 ml.) is then removed, at 200° C and under a vacuum of 2 to 3 mm Hg, which necessitates 2 to 3 hours. The polyester is then poured out while hot, and recovered in a solid and anhydrous state.

The aqueous solution at 30% of the resultant product has a milky appearance. At a concentration of 0.25% in the mixture phenol-tetrachloride acetylene, it has an inherent viscosity $\eta$ inh of 0.15 dl.g$^{-1}$.

The other characteristics are as follows:

| acid number | $I_A$ = 41.8 mg. KOH/g |
|---|---|
| hydroxyl number | $I_{OH}$ = 5.16 mg. KOH/g |
| average molecular mass in number $M_n$ = 2200 | |
| amount of sulphur in the resultant polymer S(%) = 0.83 | |
| (0.67 theoretical) | |

EXAMPLE 9

The following is introduced into a vessel:

| isophthalic acid | 315.4 g. | 1.9 moles |
|---|---|---|
| dimethyl sodiosulfosuccinate | 24.8 g. | 0.1 mole |
| diethylene glycol | 212.2 g. | 2 moles |
| tetra-isopropyl o-titanate | 0.6 ml. | |

(Molar ratio sulfosuccinate/sulfosuccinate + isophthalic = 0.05)

The condensation conditions are the same as in Example 8.

The aqueous solution at 20% of the resultant product has a milky appearance but becomes transparent after neutralization by NH$_4$OH.

Its characteristics are as follows:

| $\eta$ inh. | = 0.22 dl.g$^{-1}$ |
|---|---|
| $I_A$ | = 34.3 mg. KOH/g. |
| $I_{OH}$ | = 0 |
| $M_n$ | = 3150 (instead of 2200 in Example 8) |
| S (%) | = 0.71 (0.67 theoretical) |

EXAMPLE 10

The following is introduced into a vessel:

| isophthalic acid | 305.5 g. | 1,84 moles |
|---|---|---|
| dimethyl sodiosulfosuccinate | 39.7 g. | 0,16 mole |
| diethylene glycol | 233.2 g. | 2,2 moles |
| tetra-isopropyl O-titanate | 0.6 ml. | |

(Molar ratio sulfosuccinate/sulfosuccinate + isophthalic = 0.08)

The condensation conditions are the same as in Example 8, but the maximal temperature is 190° C.

The 20% aqueous solution is opaque, it becomes transparent after neutralization by NH$_4$OH. It has the tendency of forming an opaque gel, after several days storage. The gel is reversible by heating at 70° C.

Its characteristics are as follows:

| $\eta$ inh | = 0.13 dl.g$^{-1}$ |
|---|---|
| $I_A$ | = 27.7 mg. KOH/g. |
| $I_{OH}$ | = 31.9 mg. KOH/g. |
| $M_n$ | = 1750 |
| S (%) | = 1.02 (1.06 theoretical) |

EXAMPLE 11

The following are introduced into a vessel:

| isophthalic acid | 289.0 g. | 1.74 moles |
|---|---|---|
| dimethyl sodio-sulfosuccinate | 64.5 g. | 0.26 mole |
| diethylene glycol | 233.2 g. | 2.2 moles |
| tetra-isopropyl O-titanate | 0.6 ml. | |

(Molar ratio sulfosuccinate/sulfosuccinate + isophthalic = 0.13)

The condensation conditions are the same as in Example 8.

The resultant resin is practically colorless, slightly brittle. The 30% aqueous solution is totally transparent. Its characteristics are as follows:

| $\eta$ inh. | = 0.16 dl.g$^{-1}$ |
|---|---|
| $I_A$ | = 15.9 mg. KOH/g. |

| | |
|---|---|
| $I_{OH}$ | = 20.8 mg. KOH/g. |
| $M_n$ | = 2850 |
| $S (\%)$ | = 1.71 (1.71 theoretical) |

EXAMPLE 12

It is the same structure as in Example 11, but the reaction is carried out in a semi-large plant, and without an excess of glycol.

In a 40 liter vessel, glass-lined, of Pfaudler type, fitted with a column and a collector, a stirrer and a nitrogen admission, there are introduced, under agitation, the basic products in the following order:

| | | |
|---|---|---|
| isophthalic acid | 14.442 kg | 8.7 moles |
| dimethyl sodiosulfosuccinate | 3.224 kg | 1.3 moles |
| diethylene glycol | 10.610 kg | 10 moles |
| tetra-isopropyl o-titanate | 30 ml. | |

(Molar ratio sulfosuccinate/sulfosuccinate + isophthalic = 0.13)

It is heated under agitation while the speed is regulated at 150 r.p.m. and the nitrogen rate at 90/1 hour.

The temperature increases from 20° to 220° C is effected in 8 hours. This temperature is maintained for 2 hours before placing under vacuum.

The placing under vacuum must be carried out gradually, so as to avoid the drawing away of the non-reacted reactants. The pressure is reduced from 760 to 15 mm Hg in 30 minutes, then it is kept between 10 and 15 mm for 5 to 6 hours, with a low nitrogen stream (necessary for stripping).

The temperature is kept at 200° C.

After the atmospheric pressure has been reestablished, the water of condensation (4.2 liters) is at first removed, then the desired product is cast in plates lined with Teflon layers.

The resultant resin has a color varying from pale yellow to yellow.

it has the following characteristics:

| | |
|---|---|
| $\eta$ inh | = 0.17 dl.g$^{-1}$ |
| $I_A$ | = 28.0 mg KOH/g. |
| $I_{OH}$ | = 10.7 mg KOH/g. |
| $M_n$ | = 2700 |
| $S (\%)$ | = 1.43 (1.71 theoretical) |

The 20% aqueous solution has a milky appearance; and is stable.

EXAMPLE 13

The following is introduced into a vessel:

| | | |
|---|---|---|
| isophthalic acid | 232.4 g. | 1.4 moles |
| dimethyl sodiosulfosuccinate | 148.8 g. | 0.6 mole |
| diethylene glycol | 233.2 g. | 2.2 moles |
| tetra-isopropyl o-titanate | 0.6 ml. | |

(Molar ratio sulfosuccinate/sulfosuccinate + isophthalic = 0.3)

The condensation conditions are the same as in Example 8.

The resultant product has the following characteristics:

| | |
|---|---|
| $I_A$ | = 21.4 mg. KOH/g. |
| $I_{OH}$ | = 917 mg. KOH/g. |
| $M_n$ | = 3250 |
| $S (\%)$ | = 3.43 (3.8 theoretical) |
| Surface tension | = 55.5 dynes. cm$^{-1}$ |

(in an 1 % aqueous solution, at 20° C).

The 30% aqueous solution of this product is completely transparent. It has, at a concentration of 0.25%, in the mixture phenol/acetylene tetrachloride, an inherent viscosity of 0.9 dl.g$^{31\ 1}$.

EXAMPLE 14

The following is introduced in a vessel:

| | | |
|---|---|---|
| isophthalic acid | 166 g. | 1 mole |
| dimethyl sodio-sulfosuccinate | 248 g. | 1 mole |
| diethylene glycol | 233.2 g. | 2.2 moles |
| tetra-isopropyl o-titanate | 0.6 ml. | |

(Molar ratio sulfosuccinate/sulfosuccinate + isophthalic = 0.5)

The condensation conditions are the same as in Example 8.

The resultant resin is practically colorless and brittle, and has good stability.

Its characteristics are as follows:

| | |
|---|---|
| $\eta$ inh | = 0.095 dl.g$^{-1}$ |
| $I_A$ | = 34.8 mg. KOH/g. |
| $I_{OH}$ | = 22.8 mg. KOH/g. |
| $M_n$ | = 1820 |
| $S (\%)$ | = 5.2 (6.1 theoretical) |
| Surface tension | = 53 dynes cm$^{-1}$ |
| (in a 1 % aqueous solution at 20° C) | |

An example of manufacture of the sulfonated derivative will be given now, starting with diethylene glycol maleate, giving the diethylene glycol sodiosulfosuccinate after sulfonation.

In a flask fitted with a heating means, a stirring helix and a condenser with a dropping funnel, are introduced:

| | |
|---|---|
| diethylene glycol maleate | = 1 mole or 292 g. |
| water | = 368 g. |
| It is warmed at 80° C. | |
| In the dropping funnel above the flask are introduced: | |
| sodium metabisulphite | = 0.4 mole or 76 g. |
| water | = 100 g. |

The resultant slurry is gradually introduced in the flask so as to keep the temperature at 80° C. The addition is carried out in 25 minutes. 268 g. of water are added, so as to obtain a 50% solution of diethylene glycol sodiosulfosuccinate, and it is warmed at 90° C for 2 hours.

The thus obtained solution will be used for the manufacture of a sulfonated polyester.

EXAMPLE 15

The following is introduced into a vessel:

| | | |
|---|---|---|
| isophthalic acid | 166 g. | 1 mole |
| a 50 % solution of diethylene glycol sodiosulfosuccinate | 736 g. | 1 mole |
| diethylene glycol | 21.2 g. | 0.2 mole |
| tetra-isopropyl o-titanate | 0.6 ml. | |

(Molar ratio sulfosuccinate/sulfosuccinate + isophthalic = 0.5)

The temperature is rapidly increased to 100° C under a nitrogen stream, then gradually to 170° C. It is then distilled. The temperature is increased to 200° C. The condensation is then ended; the total duration of the condensation was 5 hours.

The excess of diethylene glycol was then distilled off under a vacuum of 20 mm Hg for 3½ hours. The polyester is then hot-cast. The thus obtained sulfonated product is orange-red, solid when cold, and water-soluble.

EXAMPLE 16

The following is introduced into a vessel:

| | | |
|---|---|---|
| isophthalic acid | 166 g. | 1 mole |
| diethylene glycolsodiosulfosuccinate solution concentrated at 80 % | 117 g. | 0.25 mole |
| diethylene glycol | 90 g. | 0.85 mole |
| tetraisopropyl o-titanate | 0.6 ml. | |

(Molar ratio sulfosuccinate/sulfosuccinate + isophthalic = 0.2)

The reaction is carried out as in Example 15. A product similar to the previous one, a little more hydroscopic, is obtained.

These polyesters are excellent sizing agents, particularly for use with threads made of polyesters such as Tergal.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation

What is claimed is:

1. A water-soluble, sulfonated polyester, comprising the polycondensation product of a mixture of dicarboxylic compounds consisting essentially of:
  a. an aromatic diacid or one of its diesters selected from the group consisting of isophthalic and terephtalic acids and the methyl, ethyl, propyl and butyl diesters thereof, and
  b. an unsaturated aliphatic diacid or anhydride or diester thereof selected from the group consisting of maleic, fumaric, and itaconic acids, the anhydrides thereof, and the methyl, ethyl, propyl and butyl diesters thereof the molar ratio of said aliphatic unsaturated diacid to said mixture of dicarboxylic compounds being comprised between 0.1 and 0.5; with
  c. a saturated glycol selected from the group consisting of ethyleneglycol and di-, tri-, tetra-, and penta ethylene-glycol, propyleneglycol and butyleneglycol said condensation product being sulfonated by the quantitative addition of sodium bisulfite or metabisulfite onto the unsaturated aliphatic chains thereof.

2. A water-soluble, sulfonated polyester comprising:
the polycondensation product of a mixture of dicarboxylic compounds consisting essentially of:
  a. an aromatic diacid or one of its diesters selected from the group consisting of isophthalic and terephthalic acids and the methyl, ethyl, propyl and butyl diesters thereof, and
  b. a diester of sodio-sulfosuccinic acid selected from the group consisting of methyl, ethyl, propyl, butyl, ethyleneglycol and diethyleneglycol diesters.

the molar ratio of the diester of sodio-sulfosuccinic acid to the mixture of dicarboxylic compounds being comprised between 0.1 and 0.5; with
  c. a saturated glycol selected from the group consisting of ethyleneglycol and di-, tri-, tetra-, and pentaethyleneglycol, propyleneglycol and butyleneglycol.

* * * * *